United States Patent
Ogilvie et al.

(10) Patent No.: US 7,213,084 B2
(45) Date of Patent: May 1, 2007

(54) SYSTEM AND METHOD FOR ALLOCATING MEMORY ALLOCATION BANDWIDTH BY ASSIGNING FIXED PRIORITY OF ACCESS TO DMA MACHINES AND PROGRAMMABLE PRIORITY TO PROCESSING UNIT

(75) Inventors: Clarence R. Ogilvie, Huntington, VT (US); Randall R. Pratt, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 10/605,591

(22) Filed: Oct. 10, 2003

(65) Prior Publication Data

US 2005/0080942 A1  Apr. 14, 2005

(51) Int. Cl.
*G06F 13/38* (2006.01)
*G06F 3/00* (2006.01)

(52) U.S. Cl. .............. 710/22; 710/5; 710/23; 710/33; 710/34; 710/31; 710/38; 710/41; 710/50; 710/52; 710/240; 710/241; 710/244; 711/151; 711/152; 711/153

(58) Field of Classification Search .......... 710/22, 710/23, 33, 38, 41, 240, 241, 244, 5, 34, 710/31, 50, 52; 711/151–153
See application file for complete search history.

(56) References Cited

U.S. PATENT DOCUMENTS

| | | | | |
|---|---|---|---|---|
| 4,400,771 A | * | 8/1983 | Suzuki et al. ............... | 711/151 |
| 4,729,090 A | | 3/1988 | Baba .......................... | 710/107 |
| 5,218,680 A | | 6/1993 | Farrell et al. ............... | 709/215 |
| 5,218,686 A | | 6/1993 | Thayer ....................... | 711/100 |
| 5,274,795 A | | 12/1993 | Vachon ....................... | 710/306 |
| 5,761,534 A | * | 6/1998 | Lundberg et al. ............ | 710/50 |
| 6,122,680 A | * | 9/2000 | Holm et al. .................. | 710/52 |
| 6,134,625 A | * | 10/2000 | Abramson .................. | 710/241 |
| 6,769,046 B2 | * | 7/2004 | Adams et al. .............. | 710/316 |

(Continued)

FOREIGN PATENT DOCUMENTS

JP  60160459 A  8/1985

(Continued)

OTHER PUBLICATIONS

IBM Technical Disclosure Bulletin, Aug. 1988, "Dynamic Arbitration Level Assignment for a Direct Memory Access Subsystem", vol. No. 31 , Issue No. 3, p. No: 32-36.*

(Continued)

*Primary Examiner*—Tammara Peyton
(74) *Attorney, Agent, or Firm*—Riyon Harding; Dugan & Dugan PC

(57) ABSTRACT

In a first aspect, a first method is provided for allocating memory bandwidth. The first method includes the steps of (1) assigning a fixed priority of access to the memory bandwidth to one or more direct memory access (DMA) machines; and (2) assigning a programmable priority of access to the memory bandwidth to a processing unit. The programmable priority of the processing unit allows priority allocation between the one or more DMA machines and the processing unit to be adjusted dynamically. Numerous other aspects are provided.

25 Claims, 5 Drawing Sheets

U.S. PATENT DOCUMENTS

| | | | |
|---|---|---|---|
| 6,795,875 B2* | 9/2004 | Gray et al. | 710/22 |
| 2002/0129184 A1 | 9/2002 | Watanabe | |
| 2004/0054857 A1* | 3/2004 | Nowshadi | 711/153 |
| 2004/0236534 A1* | 11/2004 | Wheless et al. | 702/127 |

FOREIGN PATENT DOCUMENTS

| | | |
|---|---|---|
| JP | 61123969 A | 6/1986 |
| JP | 61143863 A | 7/1986 |

OTHER PUBLICATIONS

K. Hwang, et al., "OMP: A RISC-based Multiprocessor using Orthogonal-Access Memories and Multiple Spanning Buses*", Laboratory for Parallel and Distributed Computing, University of Southern California, Los Angeles, CA 90089 1990, pp. 7-22.

Ewert et al., "Optimizing Software Performance for IP Frame Reassembly in an Integrated Architecture", WOSP 2000, Ontario, Canada, pp. 29-37.

D.J. Schuelka, IBM Technical Bulletin, "Master/Slave Cascade Channel for Microprocessor DMA", IBM Corp. 1979, vol. 22, No. 5, pp. 2041-2042.

IBM Technical Bulletin, "Multiword Direct Memory Access Integrated Drive Electronics Hogpen", vol. 39, No. 04, Apr. 1996, pp. 203-206.

* cited by examiner

| Processor/DMA | Priority |
|---|---|
| CPU | 0 |
| Slave | 1 |
| CPU | 2 |
| DMA Channel 0 | 3 |
| CPU | 4 |
| DMA Channel 1 | 5 |
| CPU | 6 |
| DMA Channel 2 | 7 |
| CPU | 8 |
| DMA Channel 3 | 9 |
| CPU | 10 |
| DMA Channel 4 | 11 |
| CPU | 12 |
| DMA Channel 5 | 13 |
| CPU | 14 |
| DMA Channel 6 | 15 |
| CPU | 16 |
| DMA Channel 7 | 17 |

← RST Value

FIG. 3

SYSTEM AND METHOD FOR ALLOCATING MEMORY ALLOCATION BANDWIDTH BY ASSIGNING FIXED PRIORITY OF ACCESS TO DMA MACHINES AND PROGRAMMABLE PRIORITY TO PROCESSING UNIT

BACKGROUND OF INVENTION

1. Field of the Invention

The present invention relates generally to integrated circuits, and more particularly to methods and apparatus for memory allocation within integrated circuits.

2. Background

An integrated circuit (IC), such as a system on a chip (SOC), may include a processing unit (e.g., a processor) which includes a subsystem (e.g., an internal memory). The processor may access the subsystem to execute an instruction or read and write data.

The IC may include one or more direct memory access (DMA) machines coupled to the processor. The DMA machines may also access the subsystem of the processor to load (e.g., preload) code or data into the subsystem before the processor executes an instruction which requires the code or data.

An application running on the IC may have a time budget that requires one or more of the DMA machines to load code and/or data into the subsystem, and the processor to execute instructions within allotted times, respectively. If one or more of the DMA machines does not load (e.g., preload) code or data, which is required by instructions to be executed by the processor, into the subsystem within the allotted time, the IC fails and the application is non-operative. Similarly, if the processor does not execute an instruction within the allotted time, the IC fails and the application is non-operative.

According to one scheme, a fixed priority may be assigned to the processor and one or more of the DMA machines. A task received from the highest-priority processor or DMA machine may be completed before other tasks. If all DMA machines are assigned a higher priority than the processor, the tasks of all the DMA machines are completed before any processor tasks. In such a system, a processor task will eventually fail to be completed within an allotted time. Alternatively, if the processor is assigned a higher priority than the DMA machines, all the processor tasks are always completed before any tasks of the DMA machines. In such a system, one or more DMA machines' tasks will eventually fail to be completed within the allotted time. For example, one or more of the DMA machines may fail to load data into the subsystem of the processor before execution of the instructions that require the data.

Because the processor and one or more DMA machines must access the subsystem to complete tasks, respectively, within the allotted times, a method of allocating priority between the processor and the one or more DMA machines is needed.

SUMMARY OF INVENTION

In a first aspect of the invention, a first method is provided for allocating memory bandwidth. The first method includes the steps of (1) assigning a fixed priority of access to memory bandwidth to one or more direct memory access (DMA) machines; and (2) assigning a programmable priority of access to memory bandwidth to a processing unit. The programmable priority of the processing unit allows priority allocation between the one or more DMA machines and the processing unit to be adjusted dynamically.

In a second aspect of the invention, a first apparatus is provided that includes (1) a processing unit for executing tasks; (2) one or more direct memory access (DMA) machines each responsible for retrieving data and providing the retrieved data to the processing unit; (3) a bus, coupled to the processing unit and the one or more DMA machines, for providing communication between each of the one or more DMA machines, the processing unit and a data resource; and (4) a dynamic priority allocation circuit for allocating priority of access to the data resource between each of the one or more DMA machines and processing unit. The dynamic priority allocation circuit is adapted to (1) assign a fixed priority to the one or more DMA machines; and (2) assign a programmable priority to the processing unit. The programmable priority of the processing unit allows priority allocation between the one or more DMA machines and the processing unit to be adjusted dynamically.

Numerous other aspects are provided in accordance with these other aspects of the invention.

Other features and aspects of the present invention will become more fully apparent from the following detailed description, the appended claims and the accompanying drawings.

BRIEF DESCRIPTION OF DRAWINGS

FIG. 3 is a table of exemplary priority values that may be assigned to a processor and a plurality of DMA channels using the dynamic priority allocation circuit in accordance with an embodiment of the present invention.

DETAILED DESCRIPTION

Figure 1:
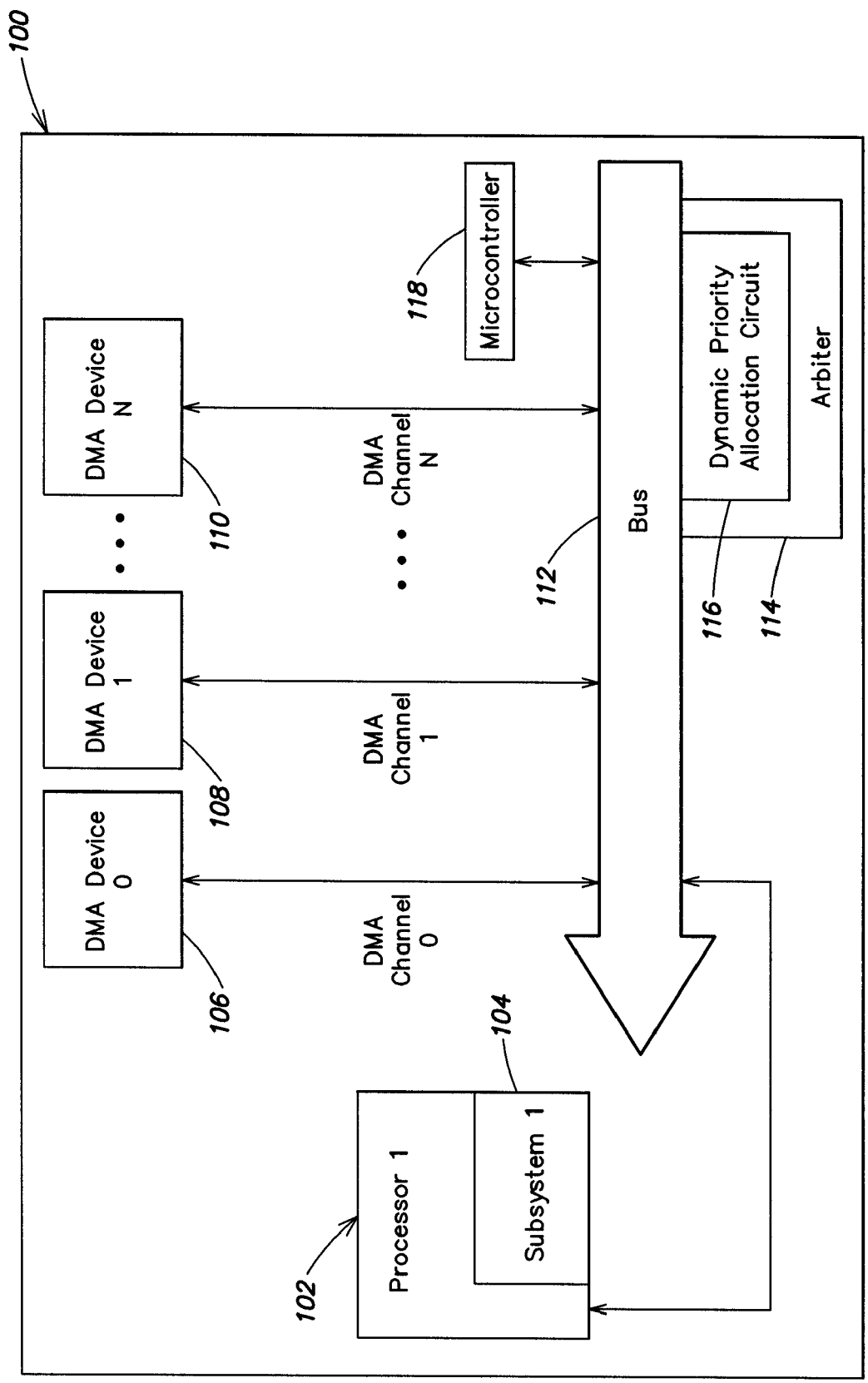
FIG. 1 is a block diagram of an integrated circuit (IC) for allocating memory bandwidth in accordance with an embodiment of the present invention.

FIG. 1 is a block diagram of an integrated circuit (IC) 100, such as a system on a chip (SOC), for allocating memory bandwidth in accordance with an embodiment of the present invention. The IC 100 may include a processing unit, such as a processor 102, which may include a subsystem 104 (e.g., internal memory). The internal memory 104 may store data required by instructions to be executed by the processor 102. The internal memory may include a group of instruction memories (IMEMs) and a group of data memories (DMEMs) that may serve as a data resource. The processor 102 may read data and/or execute instructions from the internal memory 104. Although only one processor 102 is shown in the IC 100, it will be understood that the IC 100 may include a plurality of processors 102, each of which includes a subsystem 104.

The processor 102 may be coupled to one or more devices, such as direct memory access (DMA) devices or machines 106–110 via a bus 112. A DMA device 106–110 may retrieve data required by the processor 102 to execute an instruction and/or move the data required by the processor 102 to the internal memory 104 corresponding to the processor 102.

The bus 112 (e.g., a processor local bus (PLB) or another suitable bus) provides communication between the DMA devices 106–110, processor 102, and/or the internal memory 104. More specifically, the bus 112 may be coupled to an arbiter 114 (e.g., an arbitration unit) for arbitrating bus access between a plurality of devices. When a device needs access to the bus 112, an interrupt signal may be asserted by the device for notifying the IC 100 that the device is requesting access to the bus 112. The bus 112 may include a plurality of interrupt lines for receiving interrupt signals. Each of the DMA devices 106–110 may be coupled (e.g., hard-wired) to one of the plurality of interrupt lines (e.g., lines $10_{in}$–$17_{in}$), respectively, and may assert an interrupt signal on the interrupt line. The arbiter 114 will grant a device access to the bus 112 based on the interrupt signal. If more than one device needs access to the bus 112, the arbiter 114 may grant bus access to one of the devices based on priorities assigned to the interrupt lines from which interrupt signals are received. For example, the arbiter 114 may grant bus access to a device coupled to interrupt line $10_{in}$ before granting bus access to a device coupled to interrupt line $17_{in}$ thereby assigning a fixed priority to the devices (e.g., DMA devices 106–110).

The IC 100 may include a dynamic priority allocation circuit 116, which may be coupled to the arbiter 114, for allocating fixed priorities to the DMA devices 106–110 and a programmable priority to the processor 102. The programmable priority of the processor allows a priority allocation between the DMA devices 106–110 and the processor 102 to be adjusted dynamically. The dynamic priority allocation circuit 116 may include standard logic and/or may be implemented in an application specific integrated circuit (ASIC) or as a programmable logic circuit. The details of the dynamic priority allocation circuit 116 are discussed below with reference to FIG. 2.

The IC 100 may include a device, such as a microcontroller 118, coupled to the bus 112. The microcontroller 118 may change a priority assigned to a device included in the IC 100. For example, if the microcontroller 118 receives a command from an operating system of the IC 100 to change the priority of the processor 102, the microcontroller 118 may change the priority assigned to the processor 102. The priority assigned to a task is based on the priority assigned to the device (e.g., processor) from which the task is received. Therefore by changing the priority assigned to the processor 102, the microcontroller 118 may change the priority of a task received from the processor 102. Based on the priority assigned to the task, the microcontroller 118 may allocate memory bandwidth to the task.

Figure 2:
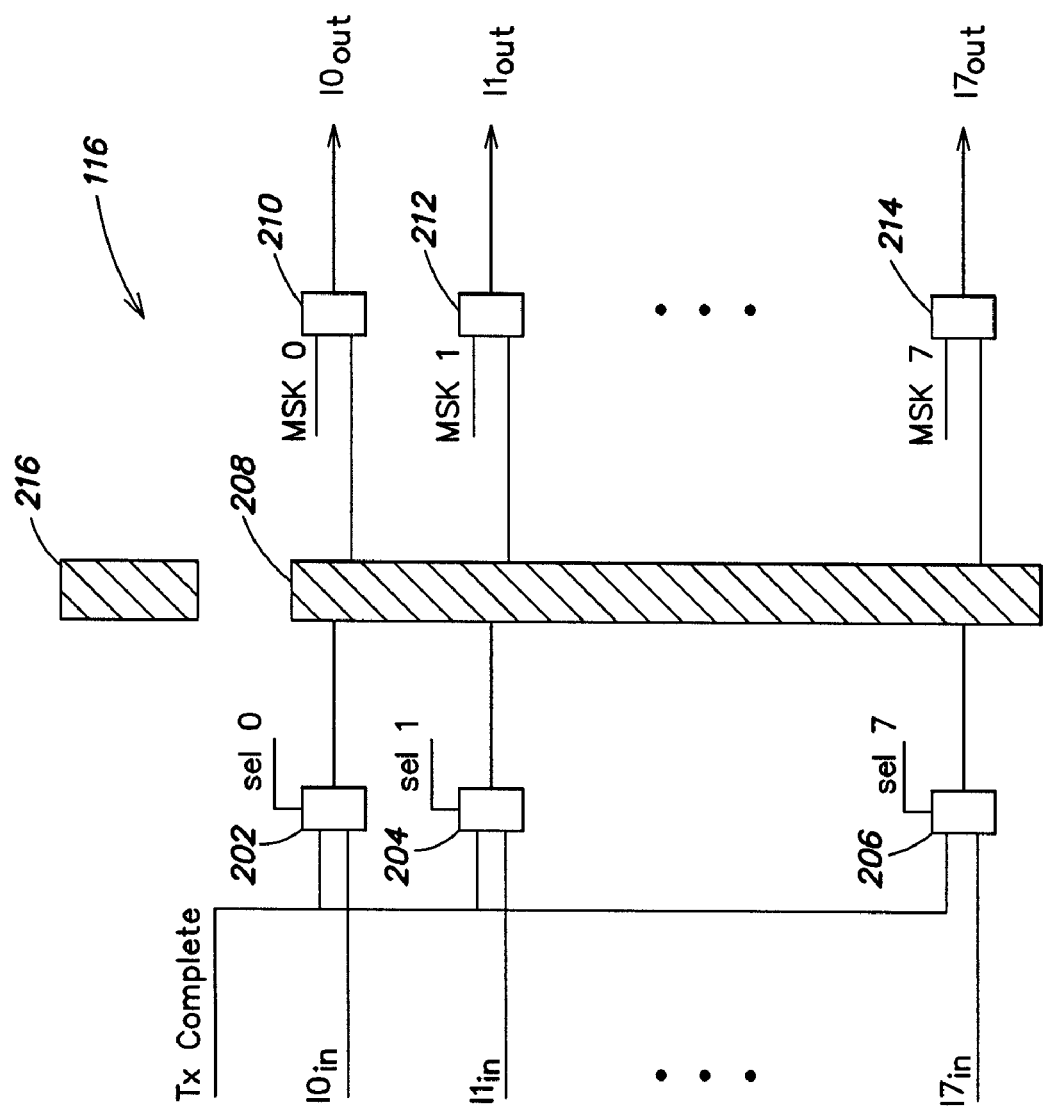
FIG. 2 is a block diagram of a novel dynamic priority allocation circuit included in the IC for allocating memory bandwidth shown in FIG. 1 in accordance with an embodiment of the present invention.

FIG. 2 is a block diagram of a novel dynamic priority allocation circuit 116 included in the IC 100 shown in FIG. 1 in accordance with an embodiment of the present invention. The dynamic priority allocation circuit 116 may include a first plurality of AND-logic 202–206 coupled to a plurality of interrupt lines $10_{in}$–$17_{in}$ included in the bus 112 and an interrupt register 208. More specifically, each of the first plurality of AND-logic 202–206 may be coupled to and receive input from a corresponding interrupt line $10_{in}$–$17_{in}$ and a Tx Complete signal, which may indicate whether a DMA device 106–110 is accessing the bus 112. For example, Tx Complete may be of a high logic state when a DMA device 106–110 is accessing the bus 112. Alternatively, Tx Complete may be of a low logic state when no DMA devices 106–110 are accessing the bus 112. Each of the first plurality of AND-logic 202–206 may receive a corresponding one of a plurality of select signals sel 0–sel 7 as inputs. Each of the select signals sel 0–sel 7 serves to activate the AND-logic to which it corresponds. More specifically, if a select signal sel 0–sel 7 coupled to corresponding AND-logic 202–206 is asserted, the AND-logic 202–206 performs a logic AND operation on the signals provided by the corresponding interrupt line $10_{in}$–$17_{in}$ and the Tx Complete line, and outputs the resulting signal for storing in the interrupt register 208. Alternatively, if the select signal sel 0–sel 7 corresponding to AND-logic 202–206 is not asserted, the AND-logic 202–206 may not perform the logic AND operation and may not output a signal to the interrupt register 208. In this manner, the IC 100 for allocating memory bandwidth may perform a logic AND operation and store signals received from an interrupt line $10_{in}$–$17_{in}$ to which a device (e.g., DMA device 106–110) is connected in the interrupt register 208. For example, if the IC 100 for allocating memory bandwidth includes eight interrupt lines $10_{in}$–$17_{in}$ that may be used for DMA devices, but only includes four DMA devices 106–110, select signals sel 0–sel 3 may be asserted for supporting the four DMA devices 106–110. The remaining select signals sel 4–sel 7 are not asserted. Therefore, the IC 100 may create a DMA channel for moving data corresponding to each DMA device 106–110 included in the IC 100. Each of the DMA channels may be assigned a fixed priority based on the interrupt line coupled to the DMA device to which the DMA channel corresponds. Other numbers of DMA devices 106–110 and/or interrupt lines $10_{in}$–$17_{in}$ may be included in the IC 100 for allocating memory bandwidth.

The dynamic priority allocation circuit 116 may include a second plurality of AND-logic 210–214 coupled to the interrupt register 208 and a plurality of mask signals MSK0–MSK7. The second plurality of AND-logic 210–214 may output one or more signals stored in the interrupt register 208. More specifically, each of the second plurality of AND-logic 210–214 may be coupled to and receive as input a corresponding signal output by the interrupt register 208 and a corresponding mask signal MSK0–MSK7. Each of the second plurality of AND-logic 210–214 performs a logic AND operation on the corresponding signal received from the interrupt register 208 and the corresponding mask signal MSK0–MSK7, and outputs a resulting signal, which serves as a modified interrupt signal $10_{out}$–$17_{out}$. For example, if the mask signal MSK0–MSK7 input to one of the second plurality of AND-logic 210–214 is asserted, the corresponding signal received from the interrupt register 208 and input by the one of the second plurality of AND-logic 210–214 may not be outputted by the AND-logic 210–214 as the modified interrupt signal $10_{out}$–$17_{out}$ and therefore, is masked.

The dynamic priority allocation circuit 116 may include a CPU priority register 216 for storing a programmable priority assigned to the processor 102. The CPU priority register 216 may store a five bit count representing the priority assigned to the processor 102. Other numbers of bits may be stored in the CPU priority register 216. In one embodiment, the dynamic priority allocation circuit 116 may be used for masking signals, which are based on interrupt signals received from DMA devices 106–110 of a lower priority than the processor priority (e.g., the value stored in the CPU priority register 216).

FIG. 3 is a table 300 of exemplary priority values that may be assigned to the processor 102 (e.g., CPU) and a plurality of DMA channels DMA Channel 0–7 using the dynamic priority allocation circuit 116 in accordance with an embodiment of the present invention. DMA Channels 0–7 may be assigned or allocated priority values of 3, 5, 7, 9, 11, 13, 15, and 17, respectively, where a smaller priority value indicates a higher priority. The priority assigned to each DMA channel DMA Channel 0–7 is fixed. It is based on a priority of a DMA device 106–110 to which the DMA channel corresponds. As stated above, the priority assigned to each of the DMA devices 106–110 is fixed and based on the priority of the interrupt line to which the DMA device 106–110 is coupled (e.g., hard-wired). The priorities that may be assigned to the processor 102 may be interleaved with the priorities assigned to the DMA channels DMA Channel 0–7, respectively. For example, the processor 102 may be assigned a programmable priority value of 0, 2, 4, 6, 8, 10, 12, 14 or 16, where a lower priority value indicates a higher priority. Different values may be used for the priority values of the DMA channels and/or the processor 102. A larger or smaller number of values may be used. The processor priority 0 may be used when the processor is reset.

As stated above, the value of the programmable priority assigned to the processor 102 may be stored in the CPU priority register 216. By changing the value stored in the CPU priority register 216, the priority of the processor may be adjusted to be higher or lower than one or more of the plurality of DMA channels DMA Channel 0–7. The priority of a task to be performed by a device (e.g., processor 102 or DMA device 106–110) may be the priority assigned to the device; and tasks of a higher priority may be executed by the IC 100 for allocating memory bandwidth before tasks of a lower priority. Therefore, changing the priority assigned to the processor 102 may affect the order in which tasks are performed by the IC 100.

A priority value (e.g., a fixed priority value) may be assigned to a slave device, such as a device (e.g., a microcontroller 118) used for changing the value stored in the CPU priority register 216. The priority value may be assigned such that the priority of the slave device is higher than the priority of the DMA channels DMA Channel 0–7 and most of the priorities that may be assigned to the processor 102. In this manner, the slave device may be granted access to the bus 112 in response to an interrupt signal from the slave device before DMA devices 106–110 which have also asserted interrupt signals. Similarly, the slave device may be granted access to the bus 112 in response to an interrupt signal from the slave device before the processor 102, which has also asserted an interrupt signal, if the processor 102 is assigned a priority lower than the slave device. Such a priority scheme allows the slave device to access the bus 112 and subsequently adjust the priority assigned to the processor 102 without waiting for DMA device tasks and most processor tasks to complete.

Figure 4:
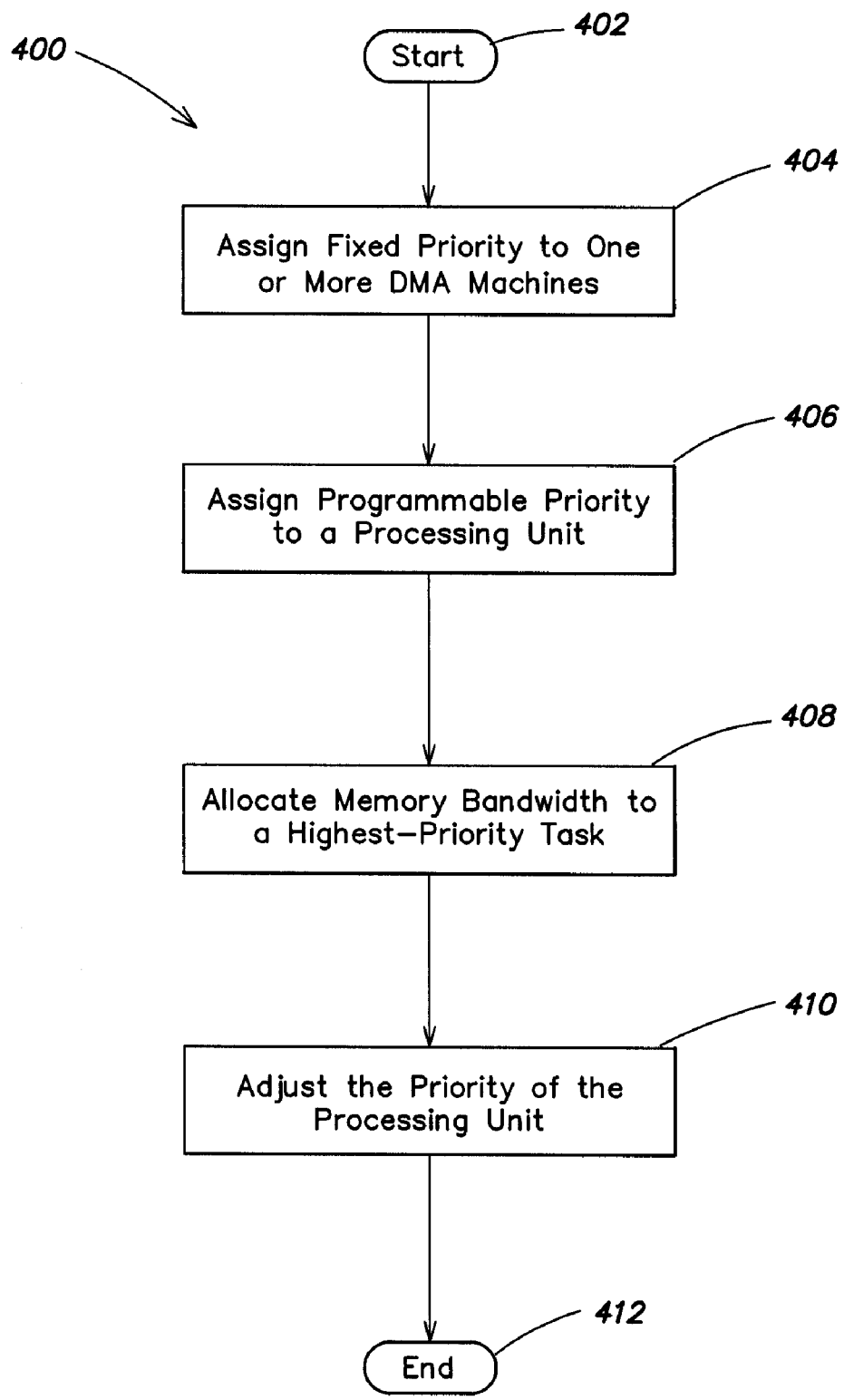
FIG. 4 illustrates an exemplary method for allocating memory bandwidth in accordance with an embodiment of the present invention.

The operation of the IC 100 for allocating memory bandwidth is now described with reference to FIGS. 1–3 and with reference to FIG. 4 which illustrates an exemplary method for allocating memory bandwidth. With reference to FIG. 4, in step 402, the method 400 begins. In step 404, a fixed priority is assigned to one or more direct memory access (DMA) machines or devices. As stated each of the one or more DMA devices 106–110 may be coupled (e.g., hard-wired) to an interrupt line $10_{in}$–$17_{in}$ included in the bus 112; and the interrupt lines $10_{in}$–$17_{in}$ are prioritized such that the arbiter 114 may grant bus access to a device coupled to a first interrupt line (e.g., $10_{in}$) before a device coupled to a second interrupt line $17_{in}$. More specifically, each of the interrupt lines may be of a different priority. The priority assigned to the one or more DMA devices 106–110 may be based on the interrupt line $10_{in}$–$17_{in}$ to which the DMA device 106–110 is connected. Because the one or more DMA devices 106–110 are hard-wired to the IC 100, and therefore, to one or more interrupt lines $10_{in}$–$17_{in}$, the priority assigned to the one or more DMA devices 106–110 is fixed. For example, if the IC 100 for allocating memory bandwidth includes eight DMA devices 106–110, the DMA devices 106–110 may be assigned priorities of 3, 5, 7, 9, 11, 13, 15, and 17, respectively. The priority assigned to a DMA channel corresponding to a DMA device 106–110 may be the priority assigned to the DMA device 106–110.

In step 406, a programmable priority may be assigned to a processing unit (e.g., processor 102). A device included in the IC 100 for allocating memory bandwidth may assign one of a plurality of priority values to the processor 102. For example, the microcontroller 118 may receive a command from the operating system of the IC 100 to assign the processor 102 a priority value. In response, the microcontroller 118 may write a count corresponding to the priority value in the CPU priority register 216 included in the dynamic priority allocation circuit 116. More specifically, the microcontroller 118 may be coupled to an interrupt line which causes the microcontroller 118 to have a priority of 1. The microcontroller 118 may assert an interrupt signal on the interrupt line to gain access to the bus 112. Once the microcontroller 118 is granted access to the bus 112, the microcontroller 118 may write the count corresponding to the priority value to the CPU priority register 216. In this manner, as stated, the processor 102 may be assigned a programmable priority of 0, 2, 4, 6, 8, 10, 12, 14, or 16; and the priorities that may be assigned the processor 102 are interleaved with the priorities assigned to the one or more DMA devices 106–110. Therefore, the programmable priority of the processor 102 allows a priority allocation between the one or more DMA devices 106–110 and the processor 102 to be adjusted dynamically.

In step 408, memory bandwidth is allocated to a task to be performed by one of the one or more DMA machines or devices (e.g., using a DMA channel) and the processing unit (e.g., processor) of the highest priority. An application running on the IC 100 may cause one or more of the DMA devices 106–110 and the processor 102 to perform tasks. Because the application runs with a real-time budget, one or more of the tasks may need to be completed within an allotted time. For example, a DMA device 106–110 may need to move data, which is required by an instruction to be executed by the processor 102, to the internal memory 104 of the processor 102 before the instruction is executed. Similarly, the processor 102 may need to execute an instruction or read data from the internal memory 104 within a given time frame. If either one or more of the DMA devices 106–110 or the processor 102 does not complete a task within a required time frame, the IC 100 fails and the application is non-operative. A task to be performed by a DMA device 106–110 may be assigned the priority of the DMA device. Similarly, a task to be performed by the processor 102 may be assigned the priority of the processor 102.

The one or more DMA devices 106–110 and/or the processor 102 may need to access the internal memory 104 via the bus 112 to perform required tasks within an allotted time. Because the memory 104 (e.g., internal memory) may be of a limited bandwidth and only one device may be granted access to the bus 112 at a time, memory bandwidth may be allocated to the highest-priority task to be performed by the DMA device 106–110 or the processor 102. In this manner, the IC 100 for allocating memory bandwidth may grant bus access and subsequently allocate memory bandwidth to the most critical task (e.g., highest-priority task) before other tasks which require bus access and memory bandwidth.

In one embodiment, access to the memory bandwidth is delayed for the one or more DMA devices 106–110 assigned a priority lower than the processor 102. Therefore, tasks to be performed by the one or more DMA devices 106–110 assigned a priority lower than the processor 102 will not be allocated memory bandwidth until tasks from higher-priority devices are allocated memory bandwidth. More specifically, interrupt signals received from the DMA devices 106–110 of a lower priority than the processor 102 may be masked, as described above, while discussing the dynamic priority allocation circuit 116 of FIG. 2. By masking the interrupt signals, the dynamic priority allocation circuit 116, prevents interrupt signals from the one or more DMA devices 106–110 of a priority lower than the processor 102 from reaching the bus 112. Consequently, such DMA devices 106–110 may not access the memory 104, and therefore, may not be allocated memory bandwidth.

In step 410, the priority of the processing unit may be adjusted. More specifically, the priority assigned to the processor 102 may be adjusted by changing the value stored in the CPU priority register 216. For example, in response to a command from the operating system, the microcontroller 118 may assert an interrupt signal for accessing the CPU priority register 216 via the bus 112 and write a new value (e.g., a count) to the CPU priority register 216 thereby adjusting the priority of the processor 102. The priority assigned to the processor 102 may be increased such that the processor priority is higher than a greater number of DMA devices 106–110 or decreased such that the processor priority is lower than a greater number of the DMA devices 106–110.

For example, while an application is running on the IC 100 for allocating memory bandwidth, a task (e.g., a critical task) to be performed by the processor 102 may be in jeopardy of not completing within an allotted time, which would result in failure of the IC 100. To avoid such a failure, the priority assigned to the processor 102, and therefore the task to be performed by the processor 102, may be changed (e.g., increased). In this manner, the processor 102 may be granted access to the bus 112 and allocated memory bandwidth before a greater number (perhaps all) of the DMA devices 106–110, which may allow the processor task to complete within the allotted time.

Alternatively, the processor 102 may not have to perform tasks of a high priority, but one or more tasks that must be performed by a DMA device 106–110 using a corresponding DMA channel may be in jeopardy of not completing within an allotted time, which may result in an IC 100 failure. The dynamic priority allocation circuit 116 may decrease the priority of the processor 102 below the priority of the DMA devices 106–110, and therefore, tasks (e.g., critical tasks) corresponding to such DMA devices 106–110 are allocated memory bandwidth before other DMA devices 106–110 and the processor 102. Consequently, the critical tasks may be completed within the allotted time.

In step 412, the method 400 ends. Through the use of the method of FIG. 4, memory bandwidth may be allocated to devices, such as one or more DMA devices 106–110 and a processor 102, included in an IC 100. Tasks are performed by the devices based on priorities assigned to the devices (and therefore assigned to the tasks), respectively, such that each task may be performed within an allotted time. The priorities assigned to the one or more DMA devices 106–110 may be fixed and the priority assigned to the processor 102 may be programmable, which allows the priority allocation between the one or more DMA devices 106–110 (and therefore the DMA channels used by the one or more DMA devices 106–110) and the processor 102 to be adjusted dynamically.

Figure 5:
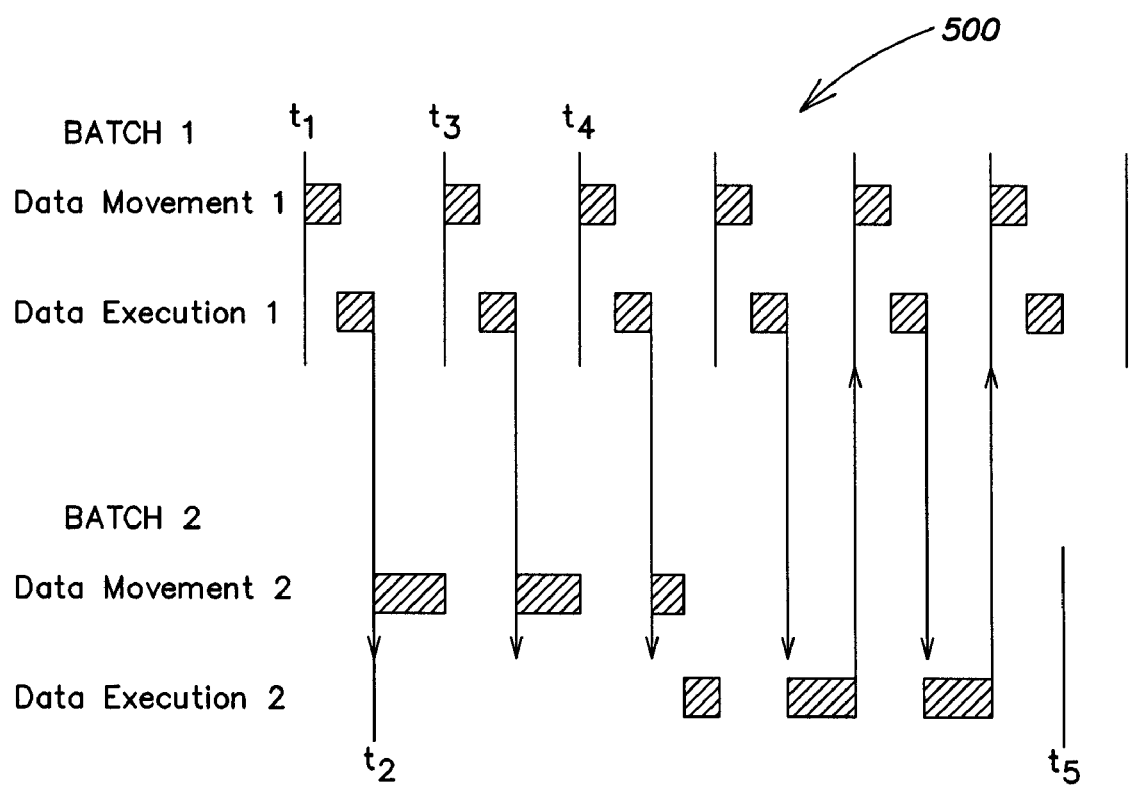
FIG. 5 illustrates a method of allocating memory bandwidth during batch processing in accordance with an embodiment of the present invention.

The operation of the IC 100 for allocating memory bandwidth is now described with reference to FIGS. 1–4, and with reference to FIG. 5 which illustrates a method 500 of allocating memory bandwidth during batch processing in accordance with an embodiment of the present invention. More specifically, FIG. 5 illustrates a first batch processing Batch 1 that must be performed at a first rate (e.g., between time $t_1$ and $t_3$, between time $t_3$ and $t_4$, etc.). During each allotted time (e.g., between time $t_1$ and $t_3$) of the Batch 1 processing, a data movement task Data Movement 1 must be performed by a first DMA device using a corresponding DMA channel (e.g., DMA Channel 0) and a data execution task Data Execution 1 must be performed by a processor. Similarly, FIG. 5 illustrates a second batch processing Batch 2 that must be performed at a second rate (e.g., between time $t_2$ and $t_5$). During the allotted time, a data movement task Data Movement 2 must be performed by a second DMA device using a corresponding DMA channel (e.g., DMA Channel 1) and a data execution task Data Execution 2 must be performed by the processor.

As stated above while describing step 404, a fixed priority may be assigned to each of the first and second DMA devices. Tasks to be performed by a DMA device and a DMA channel used for performing the tasks are assigned the same priority as the DMA device to which they correspond. For example, the first DMA device may be assigned a priority of 3 and the second DMA device may be assigned a priority of 5. Therefore, the priority of the Data Movement 1 task and DMA Channel 0 is 3, and the priority of the Data Movement 2 task and DMA Channel 1 is 5.

As stated above while describing step 406, a programmable priority may be assigned to the processor 102. For example, the processor 102 may be assigned a priority of 4. Because tasks to be performed by the processor 102 are assigned the same priority as the processor 102, the priority of Data Execution 1 and Data Execution 2 is 4.

As stated above while describing step 408, memory bandwidth is allocated to the task to be performed by one of the one or more DMA devices 106–110 and the processor 102 of the highest priority. In the above example, at time $t_1$, the dynamic priority allocation circuit 116 will allocate memory bandwidth to Data Movement 1 (to be performed by the first DMA device), which is of the highest priority (e.g., 3). Once Data Movement 1 is completed, the dynamic priority allocation circuit 116 will allocate memory bandwidth to Data Execution 1 (to be performed by the processor), which is of the highest priority (e.g., 4). It should be noted that although Data Execution 1 and Data Execution 2 are to be performed by the processor 102, because Batch 1 processing is of a higher priority than Batch 2 processing, Data Execution 1 is performed before Data Execution 2. Therefore, the Batch 1 processing is completed within the allotted time (e.g., between time $t_1$ and $t_3$).

As stated above while describing step 410, the priority of the processor 102 may be adjusted. More specifically, after Data Execution 1 is performed by the processor 102 (e.g., at time $t_2$), the dynamic priority allocation circuit 116 may lower the priority of the processor 102 to 6. Therefore, at time $t_2$, the dynamic priority allocation circuit 116 will allocate memory bandwidth to Data Movement 2 (to be performed by the second DMA device), which is of the highest priority (e.g., 5). However, while performing Data Movement 2, at time $t_3$, the first DMA device asserts an interrupt signal on an interrupt line $10_{in}$–$17_{in}$ for access to the bus 112 to perform Data Movement 1. Because the first DMA device is of a higher priority (e.g., 3) than the second DMA device (e.g., 5), which is performing Data Movement 2, Data Movement 2 is interrupted and Data Movement 1 is performed. In this manner data required by the processor 102 to execute an instruction (e.g., Data Execution 1) may be moved to the memory 104 (by performing Data Movement 1) before executing the instruction. Data Movement 2 will not resume until Data Movement 2 is the highest-priority task.

At time $t_3$, the priority of the processor 102 is increased to 4. Consequently, after Data Movement 1 is completed, Data Execution 1 may be performed, because it may be of the highest priority. In this manner, the Batch 1 processing is performed again within the allotted time (e.g., between time $t_3$ and $t_4$). After Data Execution 1 is performed by the processor 102 (e.g., between times $t_3$ and $t_4$), the dynamic priority allocation circuit 116 may lower the priority of the processor 102 to 6. At this time Data Movement 2, which is of the highest priority (e.g., 5) resumes. Thereafter, the batch processing continues in a similar manner. Using the present methods, Batch 1 processing is completed within the allotted time (e.g., between time $t_1$ and $t_3$, between time $t_3$ and $t_4$, etc.) and Batch 2 processing is completed within the allotted time (e.g., between time $t_2$ and $t_5$).

The foregoing description discloses only exemplary embodiments of the invention. Modifications of the above disclosed embodiments of the present invention which fall within the scope of the invention will be readily apparent to those of ordinary skill in the art. For instance, although in the above embodiments a fixed priority was assigned to DMA devices 106–110, in other embodiments, a fixed priority may be assigned to other devices as well. Further, although in the above embodiments, a subsystem 104 corresponds to a processor 102, in other embodiments, a plurality of processors may share and/or access the same subsystem. In such embodiments, the priorities that may be assigned to each of the plurality of processors may be interleaved with the remaining processors and devices (e.g., DMA devices 106–110) included in the IC 100. Further, in other embodiments, multiple DMA devices 106–110 may be used for accessing one or more subsystems, where a subsystem is included for each of a plurality of processors 102. Although in the above embodiments, a low priority value indicates a high priority, in other embodiments, the reverse may be true. In other embodiments, additional fixed and/or programmable priorities corresponding to a device may be interleaved with the priority values described above.

Further, although in one or more embodiments, a single DMA channel corresponds to a DMA device, in other embodiments, one or more DMA channels may correspond to a DMA device. While the dynamic priority allocation circuit 116 is shown to include a first and second plurality of AND-logic, in other embodiments, different logic may be used.

In one or more embodiments of the present invention, a timer (e.g., an external timer) may be used for determining whether a task to be performed by the processor 102 is in jeopardy of not being completed within an allotted time. When a time-out condition may occur, an external trigger may be adapted to override (e.g., via an interrupt) a programmed priority of the processor 102 and force the priority of the processor 102 to a predefined hardware level (e.g., the highest priority). Such an interrupt may be serviced with a priority different than the processor 102 and the one or more DMA devices 106–110, and therefore, gives an IC designer full control of the priorities assigned to the devices included in the IC 100.

In one or more embodiments of the present invention, a device of the highest priority is allocated memory bandwidth by stalling devices of lower priorities until the highest-priority device no longer needs the memory bandwidth. For example, clock-gating techniques may be used for stopping the processor 102 (e.g., putting the processor 102 in sleep mode). Alternatively, an acknowledgement used by a bus protocol may not be transmitted while the highest-priority device is accessing the memory bandwidth.

In one or more embodiments of the present invention, the operating system (OS) included in the IC 100 is provided with the memory bandwidth requirements of each task to be performed by the IC 100. The OS may be programmed for managing the priority values included in the dynamic priority allocation circuit 116. The OS may program monitors for ensuring tasks are completed within an allotted time. For example, if a monitor is triggered, a hardware interrupt may be used for assigning the processor 102 the highest priority of the system. A signal may be sent to the processor 102, and in response to the signal the processor 102 may execute code for determining whether the task currently performed by the processor 102 has enough memory bandwidth. If not, the priority of the processor 102 will remain at the highest priority level until the processor 102 completes the task. Thereafter, the priority of the processor 102 may be lowered. Alternatively, if the processor 102 has access to sufficient memory bandwidth for completing the current task, a next external monitor may be set, and the hardware interrupt is exited. Once the hardware interrupt is exited, the priority previously-assigned to the processor 102 is restored and interrupt signals that were masked (by the dynamic priority allocation circuit 116) before the hardware interrupt will be masked again.

Accordingly, while the present invention has been disclosed in connection with exemplary embodiments thereof, it should be understood that other embodiments may fall within the spirit and scope of the invention as defined by the following claims.

The invention claimed is:

1. A method for allocating memory bandwidth comprising:
    assigning a fixed priority of access to memory bandwidth to one or more direct memory access (DMA) machines; and
    assigning a programmable priority of access to memory bandwidth to a processing unit;
    wherein the programmable priority of the processing unit allows priority allocation between the fixed priority of the one or more DMA machines and the programmable priority of the processing unit to be adjusted dynamically.

2. The method of claim 1 wherein assigning a fixed priority to the one or more DMA machines includes assigning a fixed priority to one or more DMA channels, the one or more DMA channels corresponding to the one or more DMA machines.

3. The method of claim 2 wherein the programmable priority of the processing unit allows priority allocation between the one or more DMA channels and the processing unit to be adjusted dynamically.

4. The method of claim 1 wherein assigning a fixed priority to one or more DMA machines includes assigning a different fixed priority to each of the one or more DMA machines.

5. The method of claim 4 wherein assigning a programmable priority to the processing unit includes assigning one of a plurality of programmable processing unit priorities to the processing unit, the plurality of programmable processing unit priorities being interleaved with the different fixed priorities of the one or more DMA machines.

6. The method of claim 4 further comprising delaying access to memory bandwidth for the one or more DMA machines having a lower priority than the processing unit.

7. The method of claim 1 wherein assigning the fixed priority to one or more DMA machines includes assigning the fixed priority to a task to be performed by the one or more DMA machines; and
wherein assigning the programmable priority to a processing unit includes assigning the programmable priority to a task to be performed by the processing unit.

8. The method of claim 7 further comprising allocating memory bandwidth to the task of the one or more DMA machines and the task of the processing unit having the highest priority.

9. The method of claim 8 further comprising adjusting the priority of the processing unit.

10. The method of claim 1 further comprising delaying access to memory bandwidth for the one or more DMA machines having a lower priority than the processing unit.

11. The method of claim 1 further comprising allocating memory bandwidth to a task to be performed by one of the one or more DMA machines and the processing unit of a highest priority.

12. The method of claim 11 further comprising adjusting the priority of the processing unit.

13. An apparatus for allocating memory bandwidth comprising:
a processing unit adapted to execute tasks;
one or more direct memory access (DMA) machines each responsible for retrieving data and providing the retrieved data to the processing unit;
a bus, coupled to the processing unit and the one or more DMA machines, and adapted to provide communication between each of the one or more DMA machines, the processing unit and a data resource; and
a dynamic priority allocation circuit adapted to allocate priority of access to the data resource between each of the one or more DMA machines and the processing unit and further adapted to assign a fixed priority of access to memory bandwidth to the one or more DMA machines.

14. The apparatus of claim 13 further comprising a register coupled to the dynamic priority allocation circuit, and adapted to store the priority of the processing unit.

15. The apparatus of claim 13 wherein the dynamic priority allocation circuit is adapted to:
assign a programmable priority to the processing unit;
wherein the programmable priority of the processing unit allows priority allocation between the one or more DMA machines and the processing unit to be adjusted dynamically.

16. The apparatus of claim 15 wherein the dynamic priority allocation circuit is further adapted to assign a fixed priority to one or more DMA channels, the one or more DMA channels corresponding to the one or more DMA machines.

17. The apparatus of claim 15 wherein the dynamic priority allocation circuit is further adapted to assign a different fixed priority to each of the one or more DMA machines.

18. The apparatus of claim 17 wherein the dynamic priority allocation circuit is further adapted to assign one of a plurality of programmable processing unit priorities to the processing unit, the plurality of programmable processing unit priorities being interleaved with the different fixed priorities of the one or more DMA machines.

19. The apparatus of claim 17 wherein the dynamic priority allocation circuit is further adapted to delay access to memory bandwidth for the one or more DMA machines having a priority lower than the processing unit.

20. The apparatus of claim 15 wherein the dynamic priority allocation circuit is further adapted to assign the fixed priority to a task to be performed by the one or more DMA machines; and
assign the programmable priority to a task to be performed by the processing unit.

21. The apparatus of claim 20 wherein the dynamic priority allocation circuit is further adapted to allocate memory bandwidth to the task of the one or more DMA machines and the task of the processing unit having the highest priority.

22. The apparatus of claim 21 wherein the dynamic priority allocation circuit is further adapted to adjust the priority of the processing unit.

23. The apparatus of claim 15 wherein the dynamic priority allocation circuit is further adapted to delay access to memory bandwidth for the one or more DMA machines having a priority lower than the processing unit.

24. The apparatus of claim 15 wherein the dynamic priority allocation circuit is further adapted to allocate memory bandwidth to a task to be performed by one of the one or more DMA machines and the processing unit of the highest priority.

25. The apparatus of claim 24 wherein the dynamic priority allocation circuit is further adapted to adjust the priority of the processing unit.

* * * * *